Patented May 17, 1938

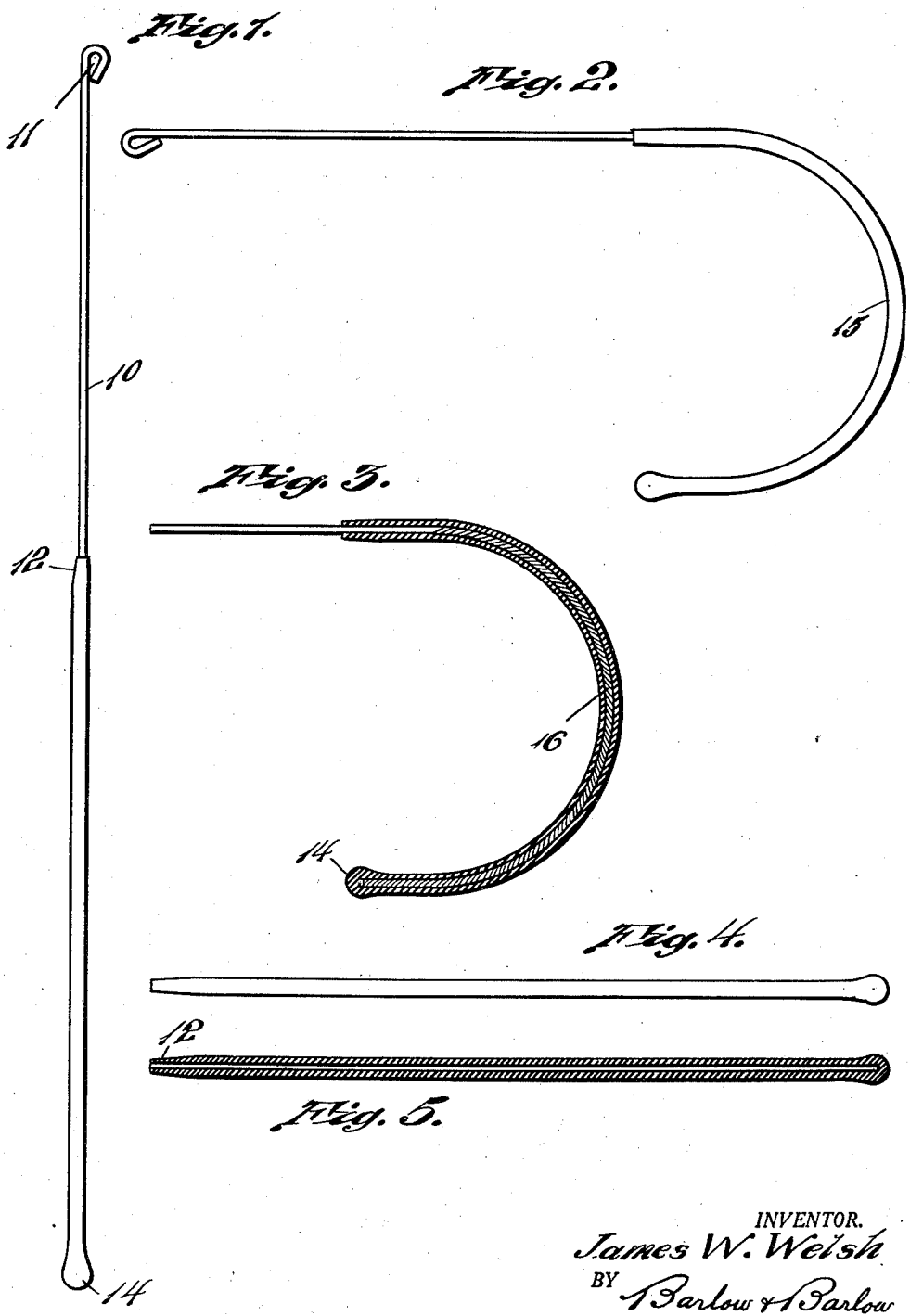

2,117,466

UNITED STATES PATENT OFFICE 2,117,466

COVER FOR SPECTACLE TEMPLES

James W. Welsh, Providence, R. I., assignor to Welsh Manufacturing Company, a corporation of Rhode Island Application April 14, 1936, Serial No. 74,317

1 Claim. (Cl. 88—52)

This invention relates to a spectacle temple; and has for one of its objects the provision of a cover for the ear engaging portion of the temple, which will be soft and comfortable in its engagement with the ear.

Another object of the invention is the provision of a cover which may be supplied as a separate unit and easily positioned upon the ear engaging portion of the temple.

Another object of the invention is the provision of a cover which may be easily and quickly formed by merely dipping a suitable core or support into a solution of rubber and withdrawing the same therefrom and at the same time providing a desirable enlargement on the end of the cover by causing the drip to settle at the end.

With these and other objects in view, the invention consists of certain novel features of construction, as will be more fully described, and particularly pointed out in the appended claim.

In the accompanying drawing:

Fig. 1 is an elevation greatly enlarged showing a wire for a temple after it has been dipped into a rubber solution and set in position;

Fig. 2 is an elevation of the temple after it has been bent to provide an arcuate ear engaging portion;

Fig. 3 is a sectional view showing a modified form of core, that shown being of helical formation along the ear engaging portion;

Fig. 4 is an elevation of the cover alone; and

Fig. 5 is a sectional view of the cover alone.

In the use of temples, it is frequently desirable that some cushioning material be provided along the ear engaging portion of the temple for more comfort or better grip on the head of the wearer; and in order that this may be formed in a simple manner, I have provided a tubular member of moldable material for extending over or covering this portion of the temple; and in order to provide such a tube in a simple manner, I dip the end of the temple or some core of approximately the same diameter as the temple into a solution of moldable material such as a solution of rubber to build up the thickness of the wall desired over the core, which cover may then be removed if desired, to be separately supplied; and the following is a more detailed description of the present embodiment of this invention, illustrating the preferred means by which these advantageous results may be obtained:

With reference to the drawing, 10 designates a temple upon which my desired covering is to be formed, there being provided a bearing portion 11 for mounting on the rim end piece or lug of the front of a spectacle frame. I dip the ear engaging portion of this temple into a solution of rubber of a consistency or a sufficient number of times to build up a wall of the thickness desired. The temple 10 is disposed in a hanging or vertical position as the rubber is coagulating or setting and a settling of the liquid or viscous substance takes place to provide a taper 12 at its upper end and an enlarged end 14 which at the same time encloses the lower end of the tubular covering thus formed.

After the rubber has set at a temperature of from 80 to 90 degrees Fahrenheit the temple will be bent into the arc shape 15 to fit about the ear, although the temple may be first bent and dipped thereafter, in which case it will be withdrawn to cause the curved portion to leave the liquid bath at substantially a right angle.

In cases where the cover is to be made a separate unit a core, preferably of aluminum, will be dipped while the same is straight, such as shown in Fig. 1, and after the covering has been formed, as above described, and the same has set, the cover will be withdrawn from the core 10 by sliding the same therefrom. Possibly a rotary action of the cover relative to the core will be had in order to overcome any tendency of the cover to grip the core by reason of the stickiness of the material. This separate cover may then be supplied to be positioned on the ear engaging portion of a temple. In cases, however, where a flexible core such as 16 is provided, the same being formed of smaller wires twisted, or helically disposed with reference to the axis of the core, or there being a spiral position of the material along this part to render it more flexible, the cover in this case will be positioned over the flexible part after the cover has been separately formed, as shown in Fig. 3, in order that the rubber solution will in no way affect or change the flexibility of the core. In some cases, however, if desired, the helical portion may be dipped in order to form the cover about the same.

As the rubber itself is flexible and elastic it may change its shape or be disposed in various forms or shapes without rupturing or permanently distorting any of its parts and thus in no way detracts from the flexibility of the core upon which it is positioned.

I thus provide a temple having an elastic or rubber cover about its ear engaging portion with the core within this covered portion being either a homogeneous wire bent to shape or flexible of a known structure, or the cover may be formed separately and furnished separately as an addition to temples which are already in use.

By the advantageous manner of forming this covering a very desirable enlargement is provided at the end of the cover for better hold on the ear and which also closes the rubber tube.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A spectacle temple comprising a metal core, a rubber coating on the ear engaging portion thereof tightly gripping the core with all air excluded by reason of the coated portion being dipped, said coating having as one piece therewith a sealing end extending across the tubular coating and of a size larger than the diameter of the coated core.

JAMES W. WELSH.